United States Patent [19]
Koo et al.

[11] Patent Number: 5,805,376
[45] Date of Patent: Sep. 8, 1998

[54] MULTI-CHANGER VIDEO CASSETTE TAPE RECORDER

[75] Inventors: Cha Ryong Koo, Songtan; Eui Jeong Kim; Myun Woo Lee, both of Seoul, all of Rep. of Korea

[73] Assignee: LG Electronics, Inc., Seoul, Rep. of Korea

[21] Appl. No.: 615,511

[22] Filed: Mar. 13, 1996

[30] Foreign Application Priority Data

Mar. 22, 1995 [KR] Rep. of Korea .................... 6115/1995

[51] Int. Cl.⁶ .................................................. G11B 15/68
[52] U.S. Cl. ............................................................. 360/92
[58] Field of Search .................................................. 360/92

[56] References Cited

U.S. PATENT DOCUMENTS

| | | | |
|---|---|---|---|
| 4,471,394 | 9/1984 | Hapke | 360/92 |
| 5,148,332 | 9/1992 | Tomita et al. | 360/92 |

*Primary Examiner*—Robert S. Tupper
*Attorney, Agent, or Firm*—Morgan, Lewis & Bockius LLP

[57] ABSTRACT

An improved multi-changer Video Cassette Recorder (VCR) for recording or reproducing more than one cassette tape without the need to manually perform an additional cassette tape changing operation, facilitating easier operation of the system. The multi-changer VCR includes a main body of the multi-changer video cassette tape recorder; a deck mechanism provided in the multi-changer video cassette tape recorder; a cassette tape receiving rotation device having a plurality of cassette tape receiving groove sections formed on an upper surface of the cassette tape receiving rotation device for receiving a plurality of cassette tapes. The cassette tape receiving groove sections are arranged at the same plane and are rectangular about the center of the tape casseter receiving rotation device in the length-wise directions of the cassette tape receiving groove sections, so that the upper surface of the cassette tape receiving rotation device is optimized, and the compact size of the same can be achieved. A driving device rotates the cassette tape receiving rotation device to a predetermined angle for placing one of the cassette tapes on the deck mechanism. A supporting device for supporting the cassette tape in cooperation with a rotation of the cassette tape receiving rotation device; and a placement device for placing a certain cassette tape on the deck mechanism is also employed.

8 Claims, 10 Drawing Sheets

MULTI-CHANGER VIDEO CASSETTE TAPE RECORDER

BACKGROUND OF THE INVENTION

1. Field of the Invention

The present invention relates to a multi-changer video cassette tape recorder (VCR) and a cassette tape loading method thereof, and particularly to an improved multi-changer VCR capable of recording or reproducing more than one cassette tape without manually performing an additional cassette tape changing operation, facilitating an easier operation of the system.

2. Description of the Conventional Art

As well known to those in the art, a conventional VCR is directed to use one cassette tape, at a time thereby recording/reproducing a certain signal on/from a tape of the cassette tape. Therefore, when it is necessary to use a plurality of cassette tapes in series, a cassette tape is first loaded, and then the cassette tape is unloaded after a predetermined time and exchanged for another one. This procedure is inconvenient and inefficient.

In addition, reproducing signals from the tape on which a certain signal is recorded for the purpose of advertising at a certain place such as an exhibition hall, a government building, and the like, an additional VCR operation person is necessary to operate the system in series, and the operator has to manually change the cassette tapes for the serial recording/reproducing operation. Furthermore; when the program to be recorded longer than the running length of a cassette tape, the operator has to inefficiently change the cassette tape with a new one during the operation.

In addition, when there are more than two operators, each operator has to change the cassette tape loaded in the VCR before using a corresponding cassette tape.

SUMMARY OF THE INVENTION

Accordingly, it is an object of the present invention to provide a multi-changer VCR, which overcomes the problems encountered in a conventional multi-changer VCR.

It is another object of the present invention to provide an improved multi-changer VCR capable of recording or reproducing at least more than one cassette tape without manually performing an additional cassette tape changing operation, facilitating easier operation of the system.

To achieve the above objects, there is provided a multi-changer VCR, which includes a main body of the multi-changer video cassette tape recorder; a deck mechanism provided in the multi-changer video cassette tape recorder; a cassette tape receiving rotation device having a plurality of cassette tape receiving groove sections formed on an upper surface of the cassette tape receiving rotation device for receiving a plurality of cassette tapes, the cassette tape receiving groove sections being arranged at the same plane and being rectangular about the center of the cassette tape receiving rotation device in the length-wise directions of the cassette tape receiving groove sections, so that the upper surface of the cassette tape receiving rotation device is optimized, and the compact size of the same can be achieved. A driving device for rotating the cassette tape receiving rotation device at a predetermined angle for placing one of the cassette tapes on the deck mechanism and a supporting device for supporting the cassette tape in cooperation with a rotation of the cassette tape receiving rotation device. A placement device is utilized for placing a certain cassette tape on the deck mechanism.

To achieve the above objects, there is provided a cassette tape loading method for a multi-changer VCR, which includes the steps of a first step which places at least more than two cassette tapes on a cassette tape receiving rotation device wherein the cassette tapes are in the same plane; a second step which places one of the cassette tapes on a deck mechanism and rotates a cassette tape receiving rotation device at a certain angle; a third step which places one of the cassette tapes on the deck mechanism; and a fourth step which loads the cassette tape to a running path so as to record/reproduce a signal of the tape of the cassette tape.

DETAILED DESCRIPTION OF THE INVENTION

Referring to FIGS. 1 through 4, a multi-changer VCR and a cassette tape loading method of one embodiment according to the present invention includes a cassette tape receiving rotation device 10 provided above a deck mechanism D provided at a lower portion of a multi-VCR main body 1 for receiving a plurality of cassette tapes therein and for recording/reproducing a certain signal on/from a tape of the cassette tape. It further includes a supporting device 12, and a placement device 33.

Here, the deck mechanism D is referred to a deck mechanism of a conventional VCR, and it may be at a certain portion where the object of the present invention can be achieved.

Figure 3:
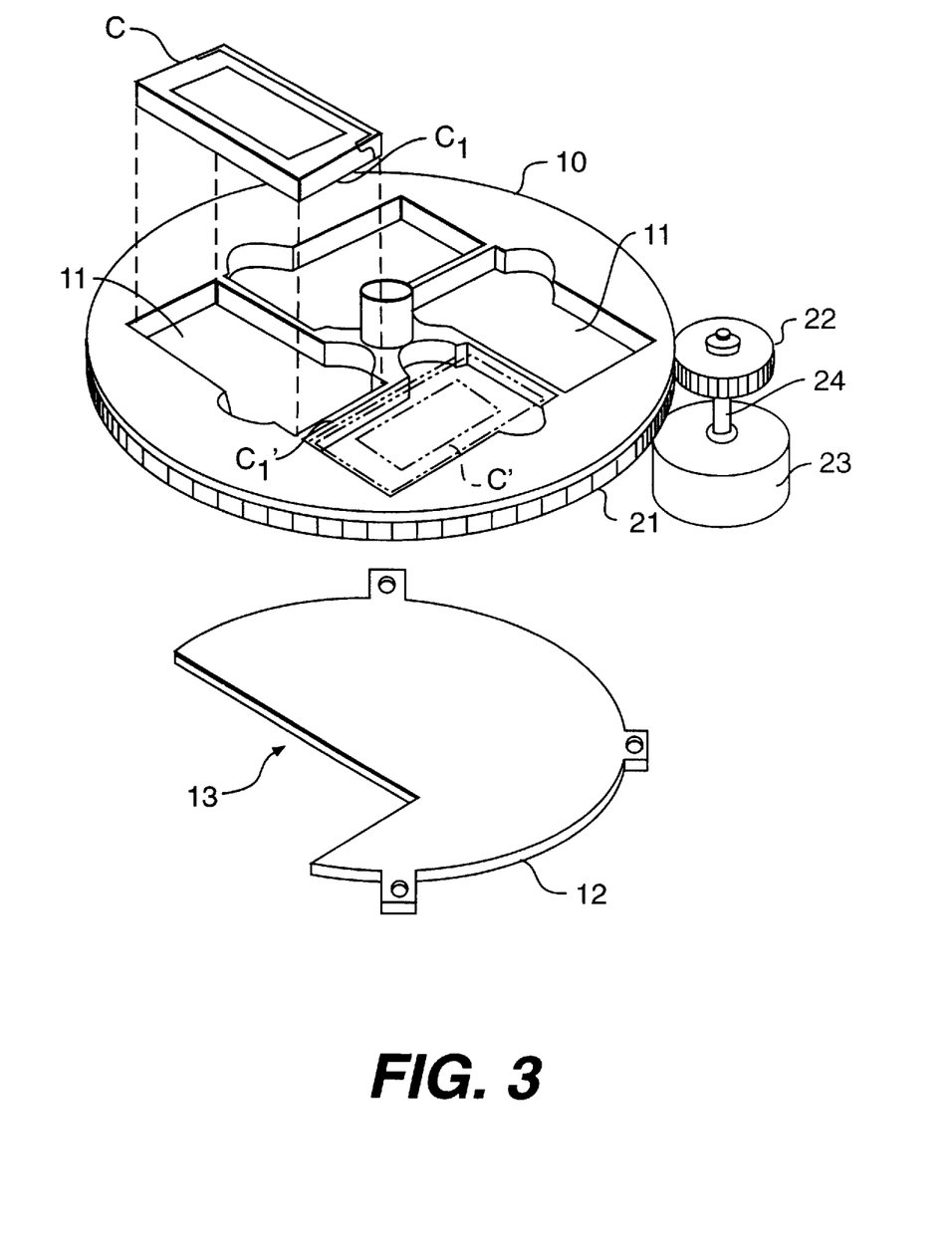
FIG. 3 is an exploded perspective view of a cassette tape receiving rotation device of a multi-changer VCR according to the present invention.

The cassette tape receiving rotation device 10 serves to move the cassette tapes C lying in the same plane and rotatable at the upper portion of the deck mechanism D, and referring to FIG. 3, cassette tape receiving groove sections 11 is formed on the upper surface of the cassette tape receiving rotation device 10 for receiving four cassette tapes C therein.

The cassette tape receiving groove sections 11 are formed so that when the cassette tapes are received therein one side C1 of a first cassette tape C is close to one side C'1 of a second cassette tape C'. Meanwhile, the number of the cassette tapes C, which are received in the cassette tape receiving groove sections 11, are preferably four (4) in this embodiment of the present invention.

In addition, the cassette tape receiving groove sections 11 formed on the cassette tape receiving rotation device 10 are at an angle of 90° from one another in a length-wise direction thereof, so that the arrangement of the cassette tape receiving rotation device can be optimized, and the size thereof can be minimized. In addition, the top of each cassette in the length-wise direction is very close to the length-wise side of an adjacent cassette thereof, so that the surface area of the cassette tape receiving rotation device can be optimized, and the size of the multi-changer can be minimized.

That is, the cassette tape receiving groove sections are arranged in same plane and forms a rectangular about the center of the tape cassette receiving rotation device when arranging each of the cassette tape receiving groove sections in its length-wise direction the upper surface of the cassette tape receiving rotation device in such a is maximized by such a configuration resulting in the achievement of a smaller size, and the and optimization of the arrangement of the cassette tape receiving groove section.

A supporting device 12 is provided immediately below the cassette tape receiving rotation device 10 and is fixed to an inner wall of the main body 1, irrespective of the cassette tape receiving rotation device 10, so as to prevent the cassette tape C from escaping to a main base 31 provided in the cassette tape receiving groove section 11.

A cut-away section 13 FIG. 3, is formed at one side of the supporting device 12 so as to guide the cassette tape C to the deck mechanism D. The cut-away section 13 serves to guide a certain cassette tape into the cassette tape receiving groove section 11 to the deck of the system.

Meanwhile, there are provided a peripheral gear 21 formed at an outer circumferential portion of the cassette tape receiving rotation device 10, a driving gear 22 meshed with the peripheral gear 21, and a motor 23 for driving the driving gear 22.

As shown in FIG. 3, the driving gear 22 is directly engaged to a rotary shaft 24 of the motor 23, or the driving force of the motor 23 may be transferred thereto by a certain driving relay device.

The construction for elastically supporting the cassette tape C placed on the deck mechanism D at the cut-away section of the supporting device will now be explained.

To begin with, a plurality of lifting support shafts 32 are threadably engaged to a predetermined portion of the main base, and the placement device 33 on which the cassette tape is placed is liftable about the lifting support shaft 32. In addition, a coiled spring 34 is inserted onto the lifting support shaft so as to elastically supporting the placement device in a direction of the rotary device 10. Here, the upper surface of the placement device 33 and the upper surface of the supporting device 12, as shown in FIG. 4, are in the same plane in cooperation with an elastic supporting force of the coiled spring 34.

Figure 6:
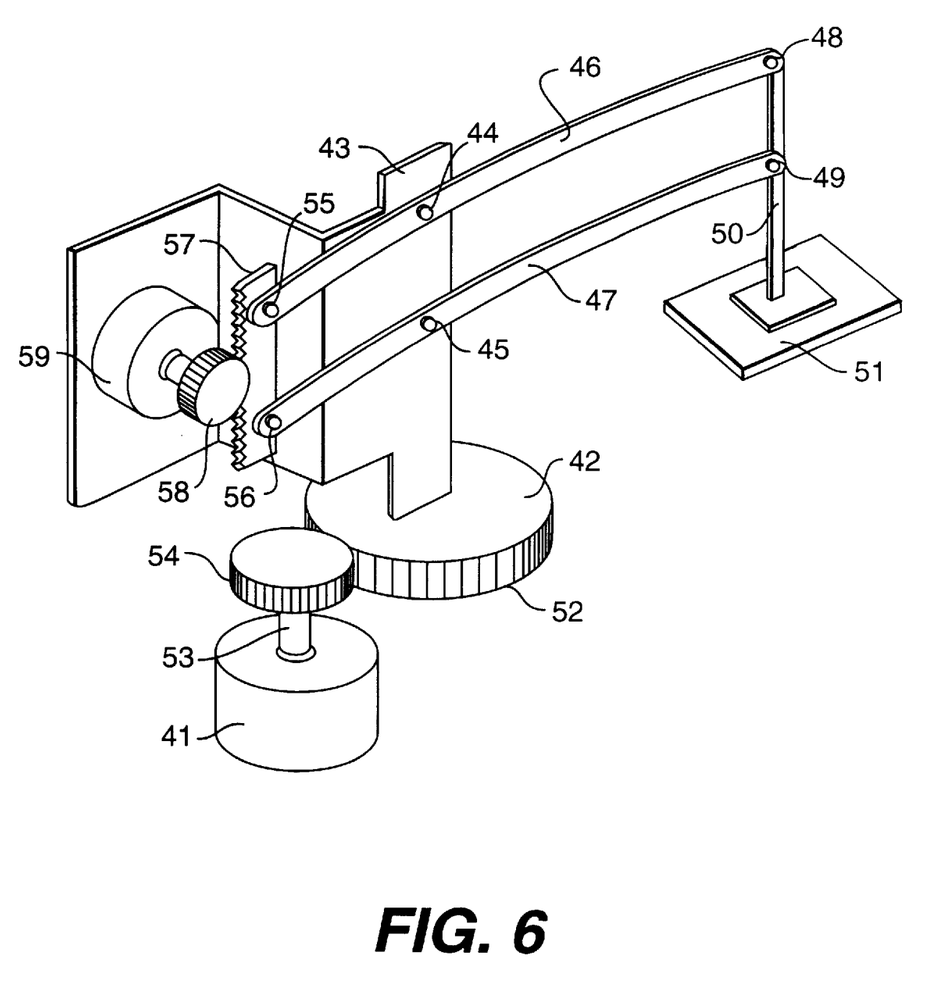
FIG. 6 is a perspective view of a placing device of a multi-changer VCR according to the present invention.

The construction for loading the cassette tape C, which is in the placement device 33, into the deck mechanism D will now be explained with reference to FIG. 6.

Figure 4:
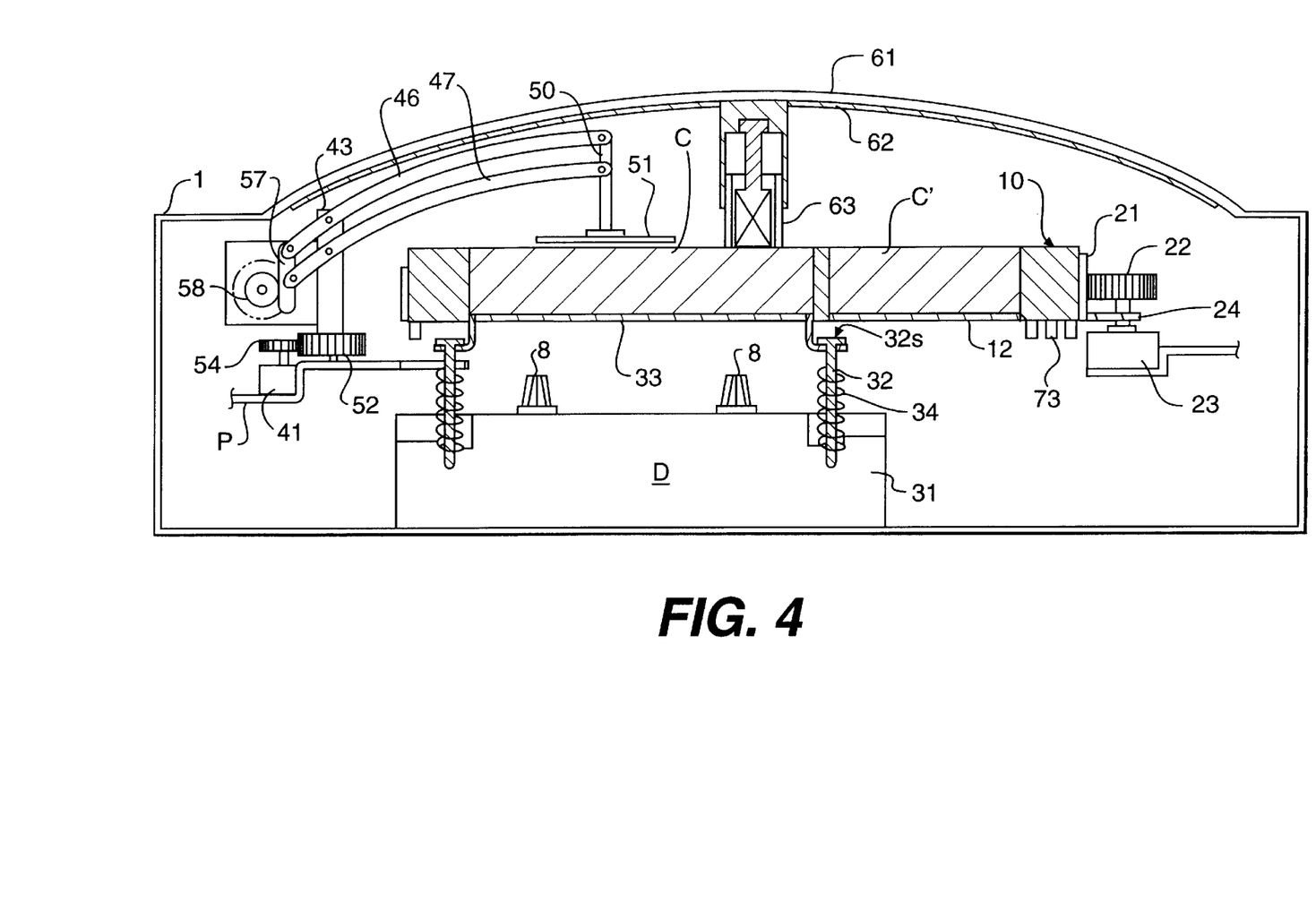
FIG. 4 is a cross-sectional view of a multi-changer VCR of which a cassette tape receiving groove section is provided with a cassette tape therein according to the present invention.
Figure 5:
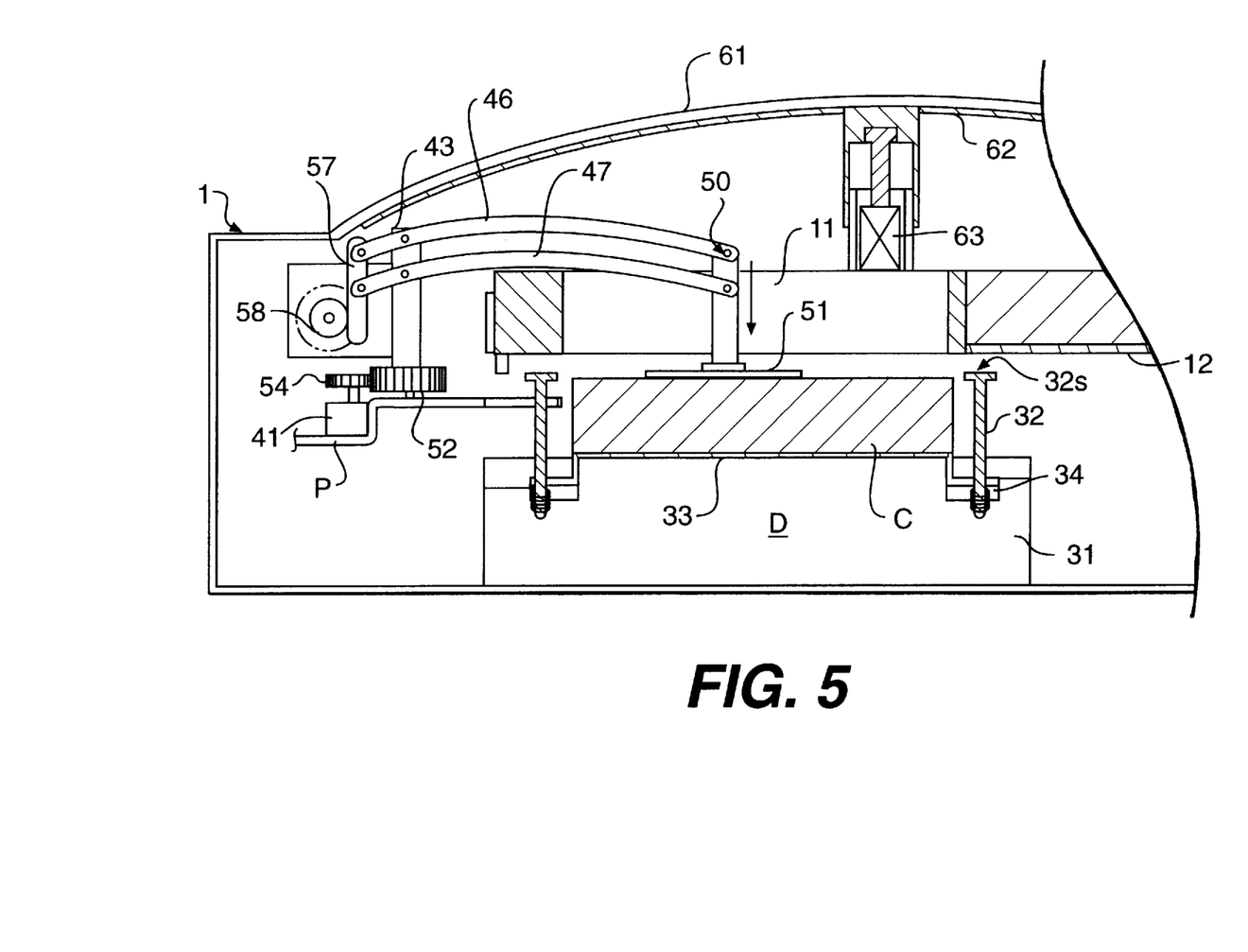
FIG. 5 is a cross-sectional view of a cassette tape which is substantially received at a deck of a multi-changer VCR according to the present invention.

A rotary device 42, which rotates by a driving force of the motor 41 is rotatably disposed at a plate P, as shown in FIGS. 4 and 5, fixed to the main body 1 of the VCR, and a bracket 43 is disposed at the upper surface thereof. Operating levers 46 and 47 are rotatably hinged to the upper and lower sides of the bracket 43, and a pressing lever 50 is connected to one end portion of the operating levers 46 and 47 by connection pins 48 and 49.

The pressing device 51 for pressing the upper surface of the cassette tape C placed on the placement device 33 at the cut-away section 13 of the supporting device 12 is fixed to a predetermined lower portion of the pressing lever 50.

In addition, a lifting/lowering device for lifting the pressing device 51 is rotatable about the hinge pins 46 and 47 and connected to the other end portions of the operating levers 46 and 47.

A peripheral gear 52 is formed at the outer circumferential portion of the rotary device 42, and a peripheral gear 52 is geared into the driving gear 54 fixed to the rotary shaft 53 of the motor 41, so that the rotary device 42 rotates in cooperation with a driving force of the motor 41.

The construction for rotating the rotary device 42 is not limited to this embodiment of the present invention. It is possible to provide a certain element which is capable of rotating the rotary device 42 in cooperation with the driving force of the motor 41, without departing from the scope and spirit of the invention described in the claims.

The lifting/lowering driving device includes a rack 57 connected to the other end portion of the operating levers 46 and 47 by the connection pins 55 and 56, a pinion 58 drivingly meshed with the rack 57, and a motor 59 fixed to the bracket 43 for driving the pinion 58.

The construction of the lifting/lowering driving device is not limited this embodiment of the present invention.

Figure 1:
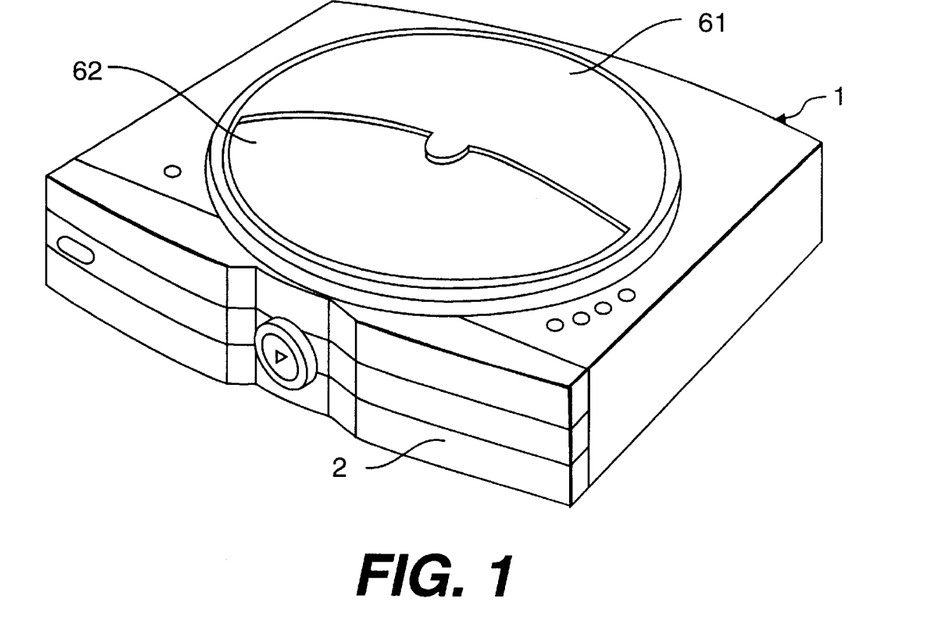
FIG. 1 is a perspective view of a multi-changer VCR so as to show a rotational door, which is closed, according to the present invention.
Figure 2:
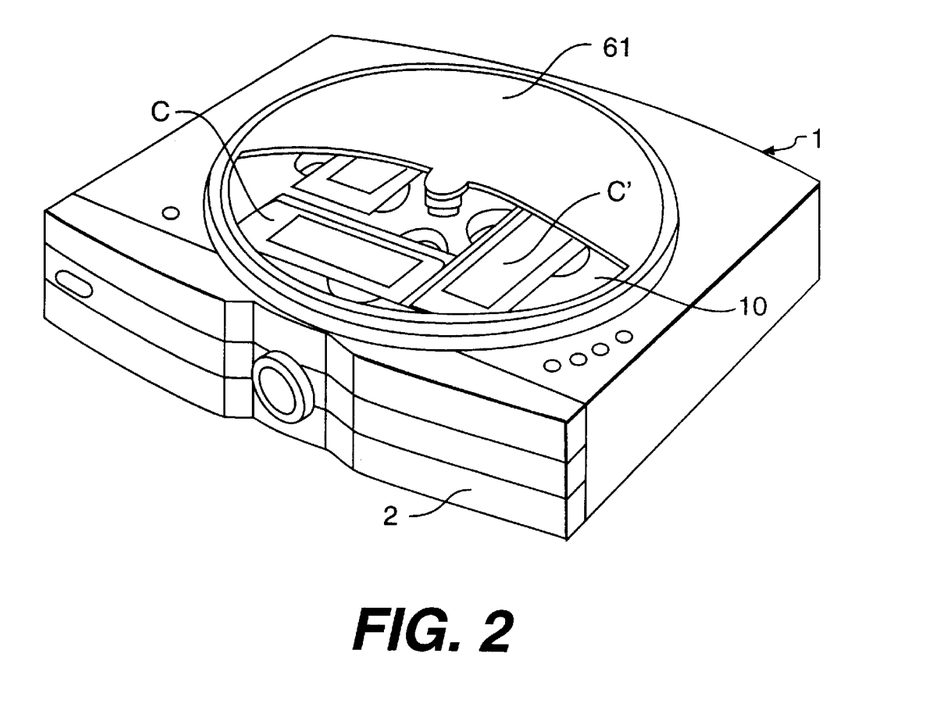
FIG. 2 is a perspective view of a multi-changer VCR so as to show a rotational door, which is opened, according to the present invention.

In addition, the multi-changer VCR according to the present invention, as shown in FIGS. 1 and 2, includes a dome shaped cover 61 and a rotational door 62 provided at the upper surface of the main body 1, so that the interior of the main body 1 of the VCR is blocked from the outside thereby. The rotational door 62 is rotatably disposed at the lower surface of the dome shaped cover 61, and when the cassette tape C is loaded/unloaded on the rotational device 10 in cooperation with the opening/closing movement of the rotational door 62. FIG. 1 shows the rotational door 62 closed, and FIG. 2 shows the rotational door 62 opened.

The opening/closing movement of the rotational door 62 may be automatically performed by the motor 63 disposed at the rotational center of the rotational device 10, and it may be manually performed by providing a handle on the upper surface thereof.

Meanwhile, the position of the cassette tape receiving rotation device 10 is detected by a position detection device.

Figure 9:
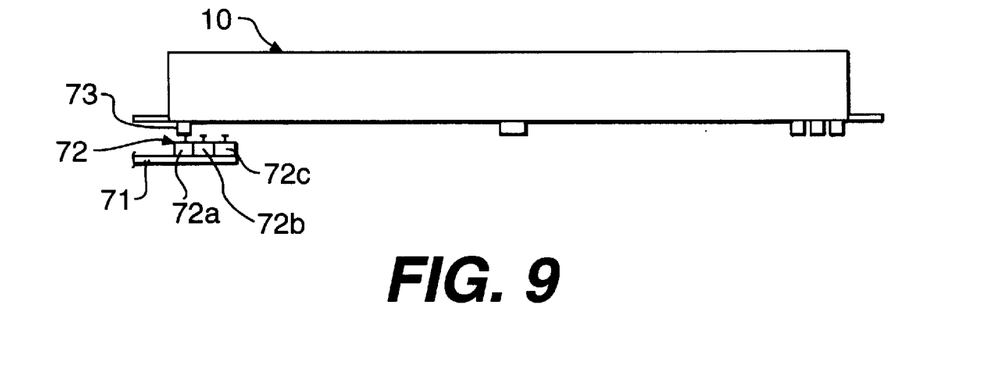
FIG. 9 is a cross-sectional view of a detection switch and a detection protrusion so as to show an operational relationship therebetween according to the present invention.
Figure 10:
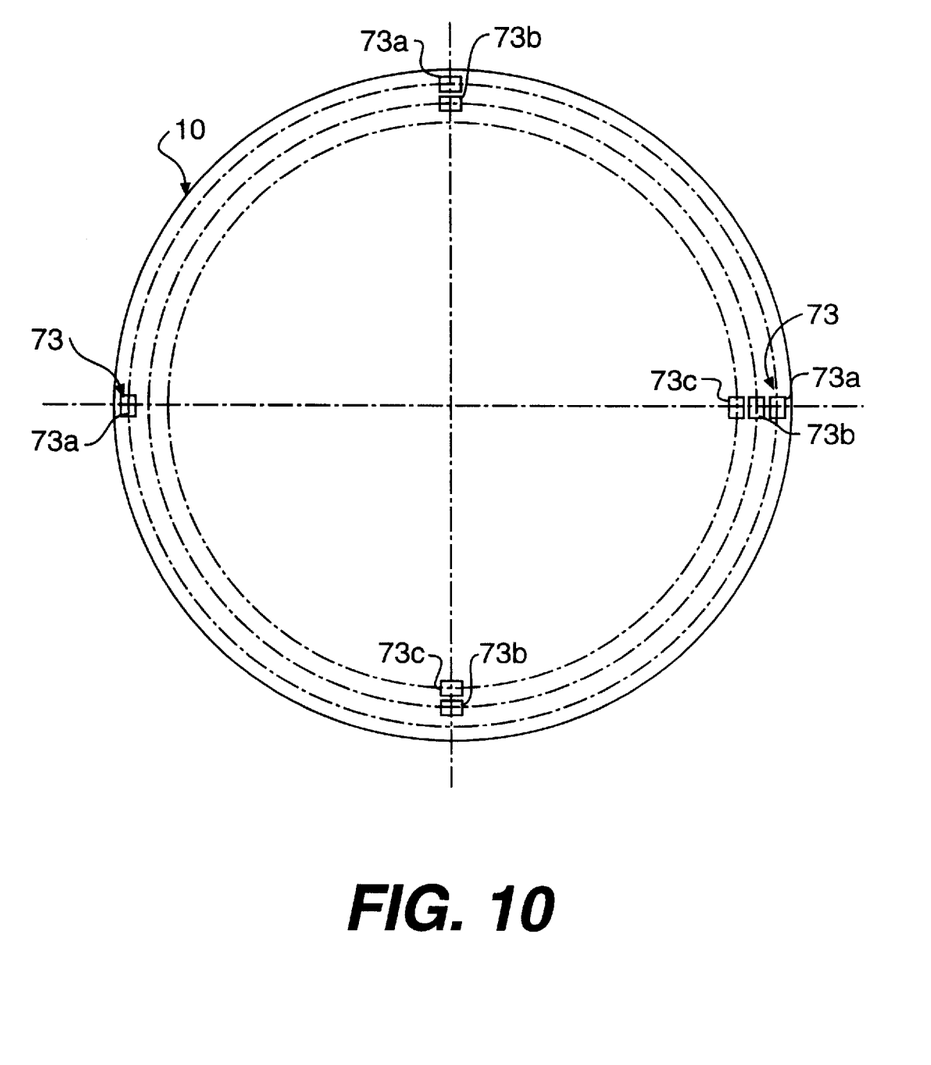
FIG. 10 is a view of plan view showing a position of a detection protrusion corresponding to a detection switch according to the present invention.

The position detection device includes a plurality of detection switches 72, see FIGS. 9 and 10 fixed to one side of an intermediate base 71 fixed to a lower portion of the supporting device 12 of the main body of the VCR, and a detection protrusion 73 provided at the lower surface of the cassette tape receiving rotation device 10 and spaced part at an angle of 90° from one another.

When the cassette tape receiving rotation device 10 is directed to adapting four (4) cassette tapes C, the detection switch 72 includes three detection switches 72a, 72b, and 72c, and the detection protrusion 73, as shown in FIG. 10, are provided at positions corresponding to a rotational trace line of the detection switches 72a, 72b, and 72c. That is, the detection protrusion 73 forms a different combination, at an angle of 90°, and each combination corresponds to the detection switches 72a, 72b, and 72c. The detection protrusion 73a is formed at an outermost rotation trace corresponding to the detection switch 72a and at a circumferential surface of the rotational device 10 in this embodiment. The detection protrusions 73a and 73b are spaced apart at an angle of 90° in the clockwise direction from the detection protrusion 73a and are formed at the outermost rotational traces. In addition, the detection protrusions 73a, 73b, and 73c are spaced apart at an angle of 90° in the clockwise direction from the detection rotation devices 73a and 73b, and the detection protrusions 73b and 73c are spaced apart at an angle of 90° from the detection protrusions 73a, 73b, and 73c and are formed at an intermediate rotation trace and the innermost rotation trace.

Hence, the cassette tape receiving rotation device 10 is rotated at angles of 90°, 180°, and 270° in accordance with a signal outputted from a microcomputer based on the selected cassette tape C. That is, the cassette tape receiving rotation device 10 does not rotate at an angle of 360° thereby preventing the twisting of the cables. It rotates at angles of 90°, 180°, and 270° in the clockwise/counterclockwise directions. More specifically, it rotates in the direction which is closest to the current position of the cassette tape C, so that the next cassette tape C is placed on the deck mechanism by rotating the cassette tape receiving rotation device 10.

Figure 11:
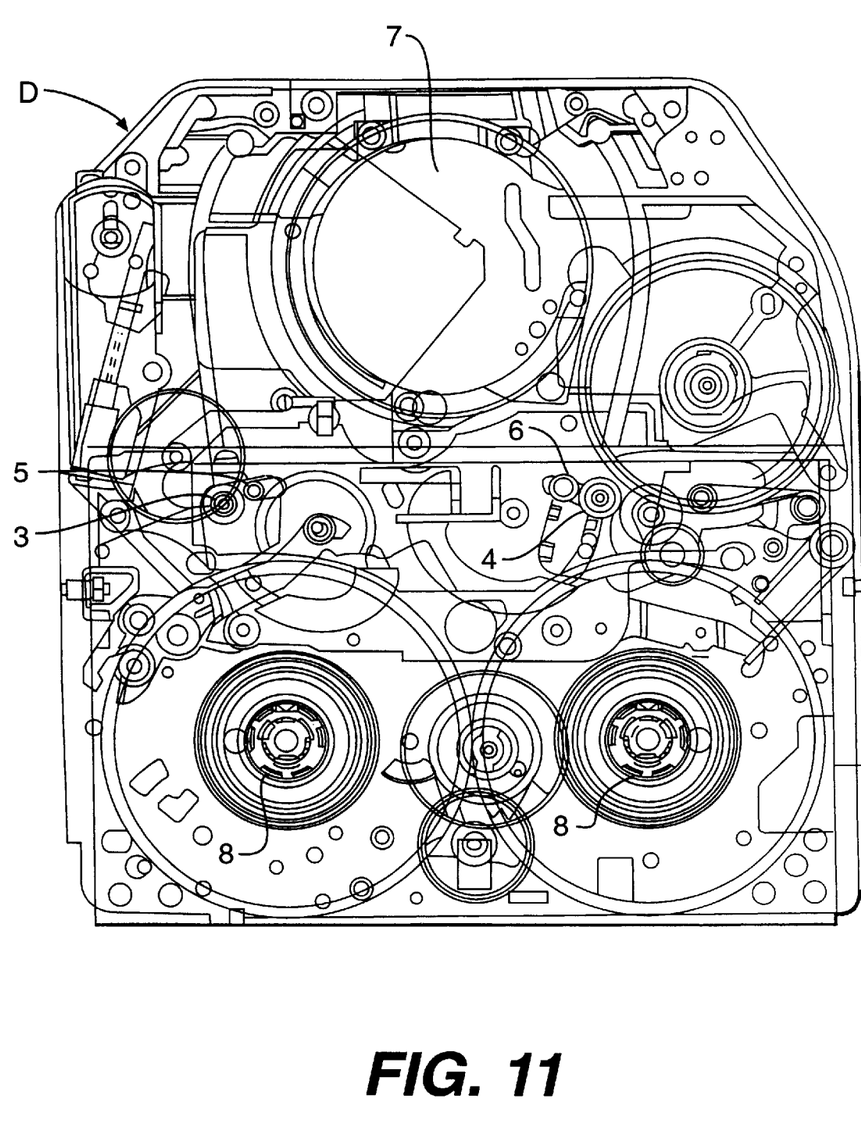
FIG. 11 is a plan view of a deck mechanism which is adapted in a multi-changer VCR according to the present invention.
Figure 12:
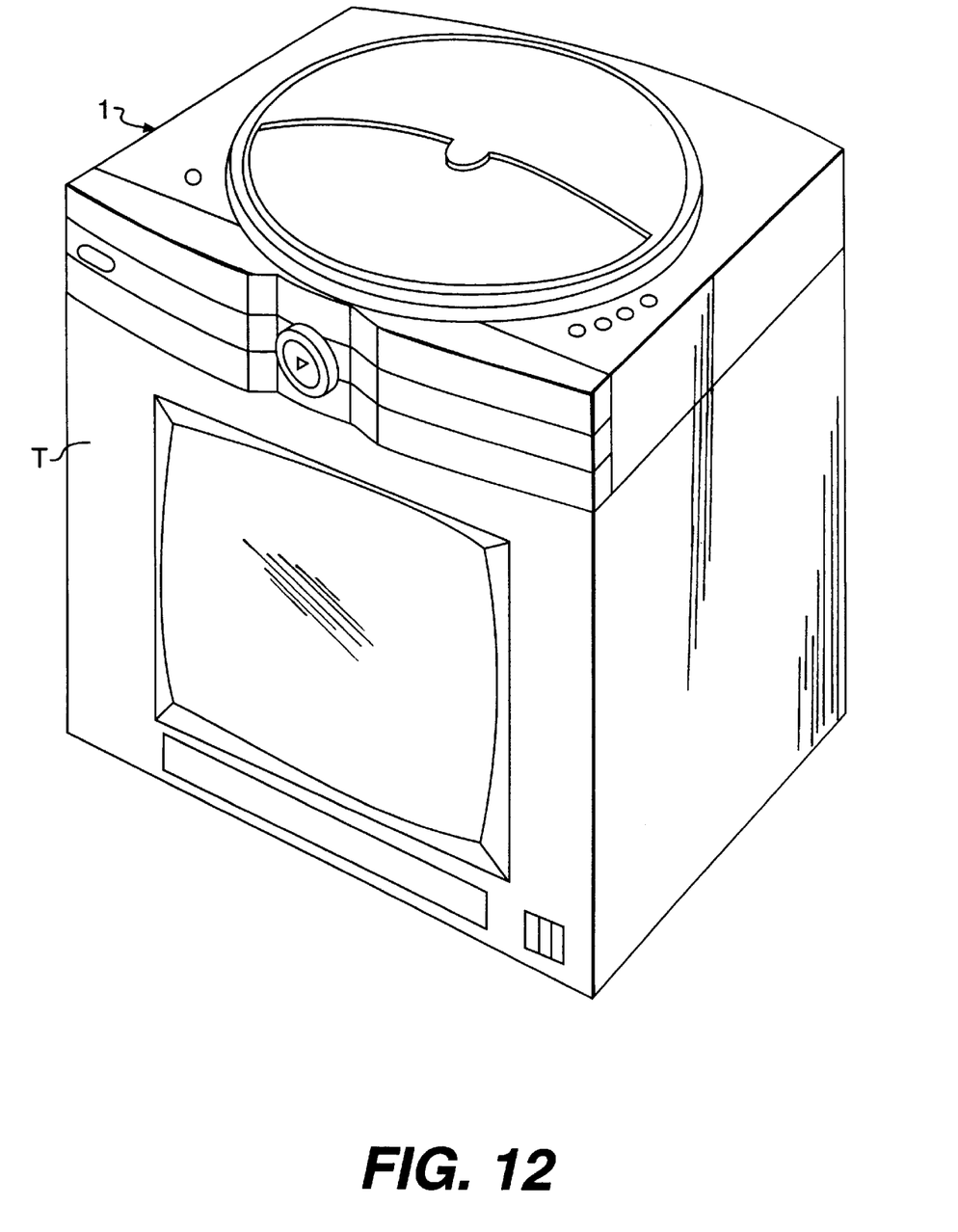
FIG. 12 is a perspective view of a television-integral type multi-changer VCR of another embodiment of a multi-changer VCR according to the present invention.

In the drawings, reference numeral 2 denotes a control panel and a display unit, and reference numerals 3, 4, 5, and 6, see FIG. 11 denote guide rollers and slant posts of a supply reel side and a wind-up reel side, and reference numeral 7 denotes a head drum, and reference numeral 8 denotes a reel table, and reference numeral 32s, see FIGS. 4 and 5 denotes a stopper for limiting the lifting of the placement device 32.

A cassette tape loading method for a multi-changer video cassette tape recorder according to the present invention includes the steps of a first step which places at least more than two cassette tapes C on the cassette tape receiving rotation device 10 wherein the above-mentioned cassette tapes C are in the same plane, a second step which places one of the cassette tapes C on the deck mechanism D and rotates the cassette tape receiving rotation device 10 at a certain angle, a third step which places one of the cassette tapes C on the deck mechanism, and a fourth step which loads the cassette tape C to a running path so as to record/reproduce a signal of the tape of the cassette tape C.

The operation of the multi-changer video cassette tape recorder and the cassette tape loading method thereof will now be explained with reference to the accompanying drawings.

To begin with, the rotation door 62 is opened in accordance with an operation of the control panel 2 of the main body 1 or using a remote controller (not shown), and a plurality of cassette tapes C are loaded into the receiving groove sections 11 of the cassette tape receiving rotation device 10.

At this time, the cassette tapes C placed in the cassette tape receiving groove sections 11 of the tape receiving rotation device 10 is placed on the placement device 33 and the supporting device 12. Since the pressing device for placing one of the cassette tapes C on the deck mechanism D, as shown in FIG. 7 in a virtual line, is at a position where the rotation device 42 is rotated at a certain angle and returned thereto, the rotation device 42 does not interfere with the insertion operation of the cassette tape C.

Figure 7:
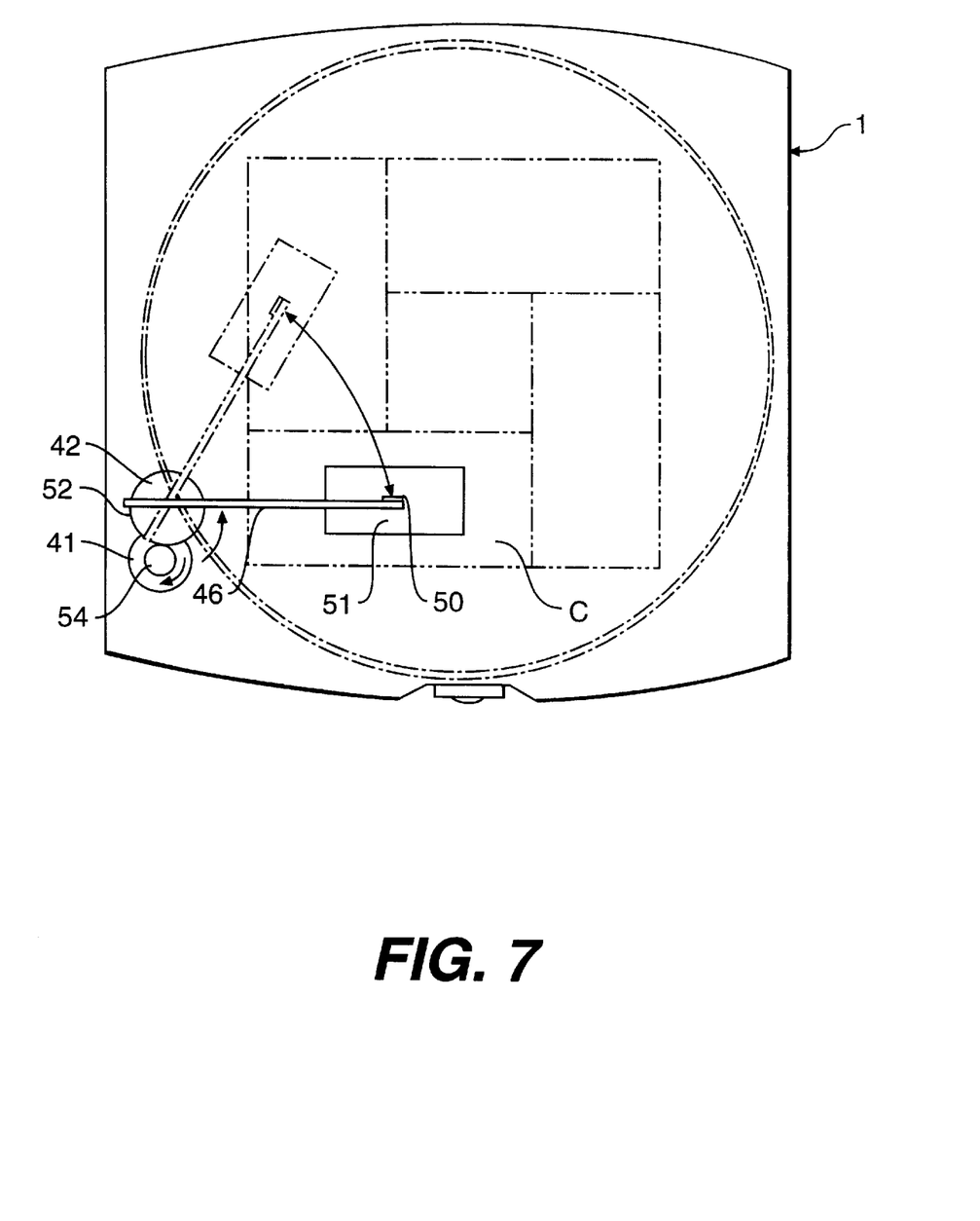
FIG. 7 is a plan view of a placing device of a multi-changer VCR so as to show its rotation state according to the present invention.

Thereafter, when the rotation door 62 is closed, as shown in FIG. 7 in a full line, and FIG. 4, the rotation device 42 is rotated in cooperation with a driving force of the motor 41, and the pressing device 51 is positioned immediately above the cassette tape C placed on the placement device 33.

In the above-mentioned method, when one of the cassette tapes C is selected, the driving gear 22 rotates the cassette tape receiving rotation device 10 in cooperation with the driving gear 22 and the peripheral gear 21 which are both driven by the motor 23. Thereafter, the cassette tape C, which is selected by the user, is placed on the placement device 33 above the deck mechanism D in cooperation with a rotation of the cassette tape receiving rotation device 10.

In more detail, when the cassette tape receiving rotation device 10 is rotated in a state that a cassette tape is loaded in the cassette tape receiving groove section 11, the cassette tape is supported by the supporting device 12 and moves on the upper surface of the supporting device 12. With the above-mentioned operation, when the cassette tape C is positioned at the cut-away portion in cooperation with the above-mentioned movement thereof, the rotation of the cassette tape receiving device 10 stops, and the cassette tape C positioned at the cut-away portion 13 of the supporting device 12, as shown in FIG. 4, is substantially supported by the placement device 33 of the supporting device which is to be explained hereinunder. The cassette tape C supported by the placement device 33 is in a ready mode so as to move to the deck mechanism D.

Thereafter, the process for loading the cassette tape to a deck is as follows.

The motor 59 is driven in accordance with a control of the microcomputer (not shown), and the driving force of the motor 59 is transferred to the rack 57 through the pinion 58, and the rack 57 is lifted. As shown in FIG. 5, the operating levers 46 and 47 rotate in the clockwise direction about the hinge pins 44 and 45, and the pressing device 51 presses the cassette tape C which is supported by the placement device 33.

As the cassette tape C which is supported by the placement device 33 is pressed by the pressing device, the placement device 33 overcomes the elastic force of the elastic device 34 inserted onto the lifting/lowering support shaft 32 and is lowered. Therefore, the cassette tape C, as shown in FIG. 11, is placed on the deck mechanism D.

Thereafter, the guide rollers 3 and 4 and the slant posts 5 and 6 of the supply reel side and the take-up reel side lead the tape of the cassette tape C and move along the loading path for winding the tape on the outer surface of the head drum 7, so that a recording and reproducing operation of the cassette tape C is performed.

In addition, when the user wants to use another cassette tape C, the current cassette tape C is unloaded in the reverse order of the loading order. The cassette tape receiving rotation device 10 is rotated at a certain angle in a certain direction. The remaining cassette tape C is loaded in the above-mentioned manner.

Figure 8:
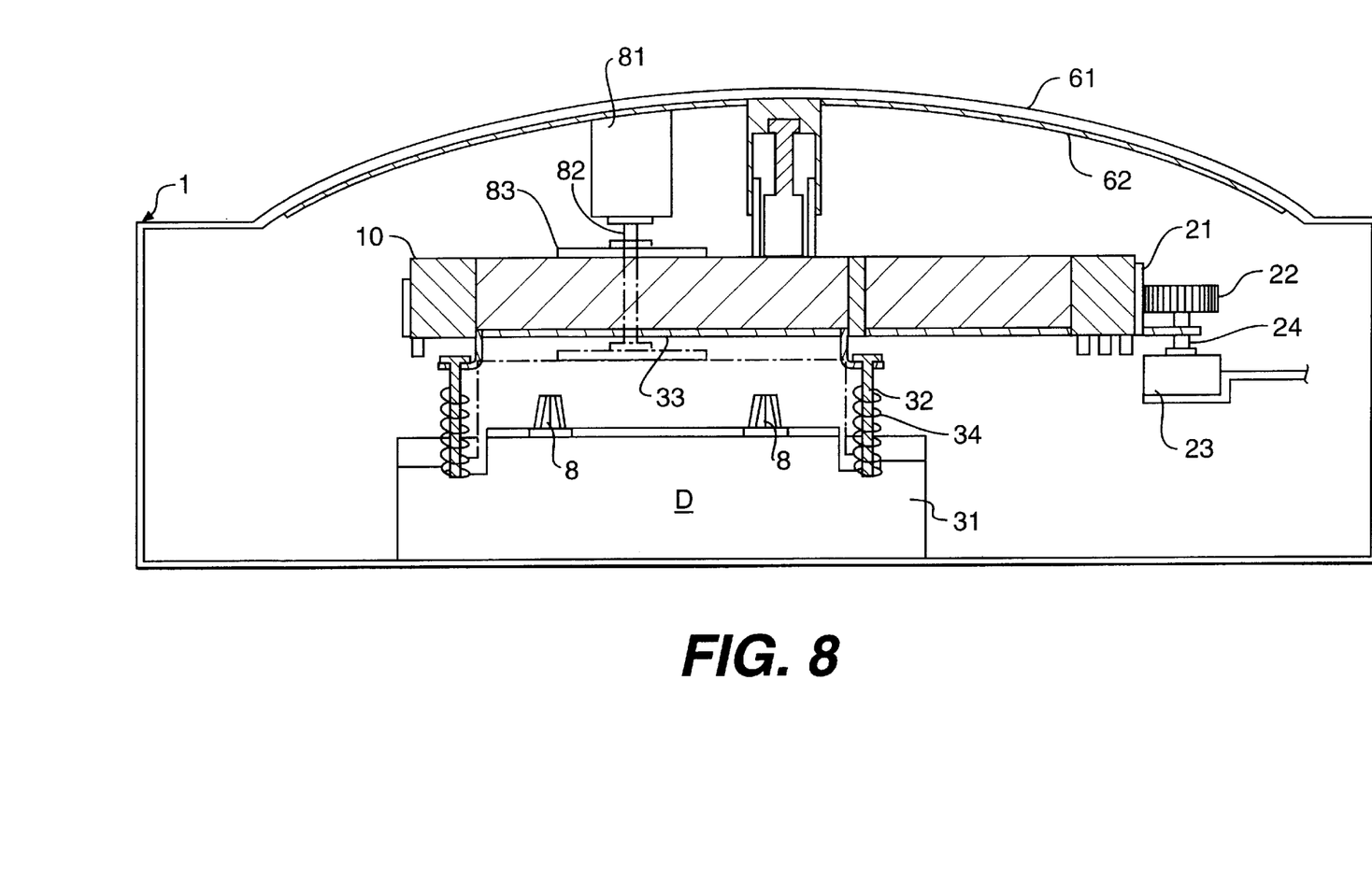
FIG. 8 is a cross-sectional view of another embodiment of a placing device of a multi-changer VCR according to the present invention.

Meanwhile, FIG. 8 shows another embodiment of a placing device of a multi-changer VCR according to the present invention, which is directed to placing the cassette tape C on the placement device on the deck mechanism D in a different manner. That is, as shown therein, the multi-changer VCR includes a solenoid 81 fixed to a lower portion of the rotation door 62, and a pressing device 83 connected to a plunger 82 of the solenoid 81, so that the cassette tape C can be placed by lowering the plunger 82 in a state that the solenoid 81 is supplied with an electric power when lowering a certain cassette tape C.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A multi-changer video cassette tape recorder, comprising:

a main body of the multi-changer video cassette tape recorder;

a deck mechanism provided in the multi-changer video cassette tape recorder;

a cassette tape receiving rotation device having a plurality of cassette tape receiving groove sections formed on an upper surface of the cassette tape receiving rotation device for receiving a plurality of cassette tapes therein, the cassette tape receiving groove sections being arranged on a common plane a cassette tape receiving rotation device having a plurality of cassette tape receiving groove sections formed on an upper surface of the cassette tape receiving rotation device for receiving a plurality of cassette tapes therein, the cassette tape receiving groove sections being arranged on a common plane and forming a rectangle about a center of the tape cassette receiving rotation device when arranging each of the cassette tape receiving groove sections in its length-wise direction, where each cassette is arranged so that one top side of each cassette abuts the length-wise portion of an adjacent cassette and each of the receiving groove sections is configured to maximize the use of the upper surface of the cassette tape rotation device;

a rotator for rotating the cassette tape rotation device at a predetermined angle for placing one of the cassette tapes on the deck mechanism;

a supporting device for retaining the cassette tape in a proper orientation so that it can be loaded into the deck mechanism upon rotation of the cassette tape by the rotation device; and a placement device for placing a certain cassette tape on the deck mechanism;

wherein the placement device lifts/lowers the cassette to be played to the deck mechanism, and includes;

a solenoid including a plunger coupled to a lower surface of a rotation door;

a pressing device coupled to a distal end of the plunger of the solenoid for placing the cassette in position for playing by the cooperation of the solenoid, the plunger, and the pressing device.

2. The video cassette tape recorder of claim 1, wherein the rotator includes:

a peripheral gear disposed at an outer circumferential surface of the cassette tape receiving rotation device;

a driving gear intermeshed with the peripheral gear; and a motor coupled to the driving gear for transferring a driving force to the driving gear.

3. The video cassette tape recorded of claim 1, wherein the supporting device includes:

a plurality of lifting/lowering support shafts engaged to a predetermined portion of a main base;

a placement device being lifted/lowered about the plurality of lifting/lowering support shafts; and an elastic device inserted onto the lifting/lowering devices, respectively, for elastically supporting the lifting/lowering devices so that the upper surface of the placement device and the upper surface of the supporting device can be in the same plane.

4. The video cassette tape recorder of claim 1, wherein the main body includes a cover for substantially covering the upper surface of the same and a rotation door rotatably engaged to the cover.

5. The video cassette tape recorder of claim 1, wherein a plurality of detection switches are provided below the cassette tape receiving rotation device, and a plurality of detection protrusions are formed at a switch rotation trace of the lower surface of the cassette tape receiving device, so that the rotation position of the cassette tape receiving rotation device is detected by the detection switch and the detection protrusion.

6. The video cassette tape recorder of claim 1, wherein the main body is integral with a television set, the television set being arranged under the main body.

7. A multi-changer video cassette tape recorder, comprising:

a main body of the multi-changer video cassette tape recorder;

a deck mechanism provided in the multi-changer video cassette tape recorder;

a cassette tape receiving rotation device having a plurality of cassette tape receiving groove sections formed on an upper surface of the cassette tape receiving rotation device for receiving a plurality of cassette tapes therein, the cassette tape receiving groove sections being arranged on a common plane and forming a rectangle about a center of the tape cassette receiving rotation device when arranging each of the cassette tape receiving groove sections in its length-wise direction, where each cassette is arranged so that one top side of each cassette abuts the length-wise portion of the adjacent cassette and each of the receiving groove sections is configured to maximize the use of the upper surface of the cassette tape receiving rotation device;

a rotator for rotating the cassette tape receiving rotation device at a predetermined angle for placing one of the cassette tapes on the deck mechanism;

a supporting device for retaining the cassette tape in a proper orientation so that it can be loaded into the deck mechanism upon rotation of the cassette tape by the rotation device; and a placement device for lifting/lowering a certain cassette tape onto the deck mechanism;

wherein the placement device lifts/lowers the cassette to be played on the deck mechanism, and includes;

a rotation device driven in cooperation with a rotation of a motor;

an operation lever rotatably engaged to an upper and lower portion of a bracket fixed to the rotation device in a standing state;

a pressing lever fixed to a lower portion of the operating lever for pressing an upper portion of a cassette tape and for placing the cassette tape on the deck mechanism; and a lifting/lowering device connected to a distal end of the operating lever for lifting/lowering the pressing device.

8. The video cassette tape recorder of claim 7, wherein the lifting/lowering device includes:

a rack coupled to the distal end of the operating lever opposite the pressing lever;

a pinion communicating with the rack; and a motor coupled to the pinion for transferring a driving force to the pinion.

* * * * *